Figure 1:
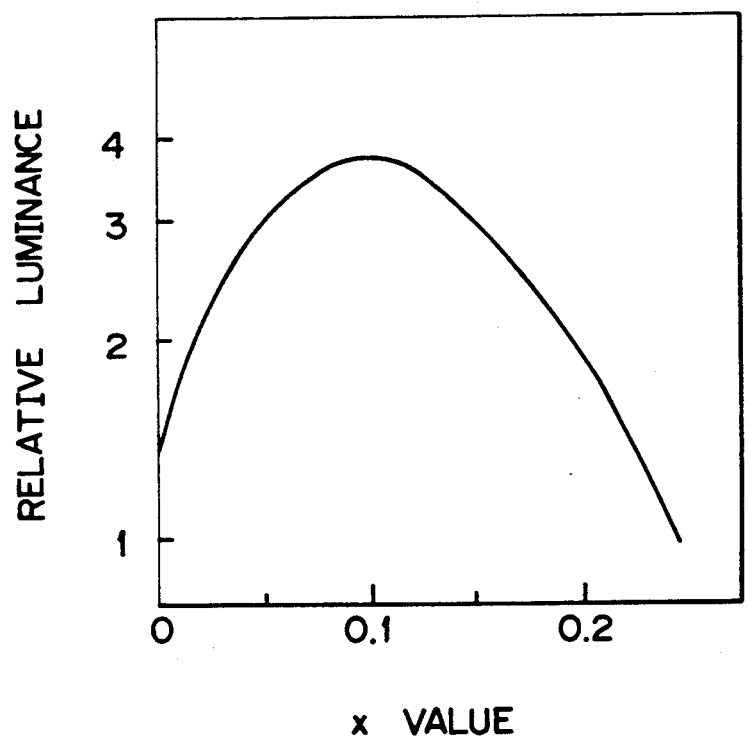

United States Patent [19]

Umemoto et al.

[11] Patent Number: 5,089,170
[45] Date of Patent: Feb. 18, 1992

[54] PHOSPHOR

[75] Inventors: Chiyuki Umemoto; Kenji Takahashi, both of Kaisei, Japan

[73] Assignee: Fuji Photo Film Co., Ltd., Kanagawa, Japan

[21] Appl. No.: 387,427

[22] Filed: Jul. 28, 1989

Related U.S. Application Data

[63] Continuation of Ser. No. 256,173, Oct. 11, 1988, abandoned, which is a continuation of Ser. No. 134,562, Dec. 8, 1987, abandoned, which is a continuation of Ser. No. 20,229, Mar. 2, 1987, abandoned, which is a continuation of Ser. No. 841,044, Mar. 17, 1986, abandoned, which is a continuation of Ser. No. 741,020, Jun. 3, 1985, abandoned, which is a continuation of Ser. No. 497,805, May 25, 1983, abandoned.

[30] Foreign Application Priority Data

May 28, 1982 [JP] Japan ................................. 57-89875

[51] Int. Cl.$^5$ ............................................. C09K 11/85
[52] U.S. Cl. ............................................. 252/301.4 H
[58] Field of Search ................................ 252/301.4 H

[56] References Cited

U.S. PATENT DOCUMENTS

| | | | |
|---|---|---|---|
| 3,659,136 | 4/1972 | Grodkiewicz | 252/301.4 HX |
| 4,057,508 | 11/1977 | Wolfe et al. | 252/301.4 H |
| 4,100,101 | 7/1978 | Messier et al. | 252/301.4 H |
| 4,180,478 | 12/1979 | Omi et al. | 252/301.4 H |

FOREIGN PATENT DOCUMENTS

| | | |
|---|---|---|
| 21342 | 1/1981 | European Pat. Off. ..... 252/301.4 H |
| 29963 | 6/1981 | European Pat. Off. . |

Primary Examiner—Jack Cooper
Attorney, Agent, or Firm—Sixbey, Friedman, Leedom & Ferguson, Jr.

[57] ABSTRACT

A divalent europium activated barium flourohalide phosphor wherein a portion of barium is replaced with an alkali metal and a trivalent metal, having the formula:

$$Ba_{1-x}M_{x/2}L_{x/2}FX:yEu^{2+}$$

in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is a least one halogen selected from the group consisting of Cl, Br and I; and x and y are numbers satisfying the conditions of $10^{-2} \leq x \leq 0.5$ and $0 < y \leq 0.1$, respectively.

3 Claims, 1 Drawing Sheet

PHOSPHOR

This application is a continuation of Ser. No. 07/256,173, filed Oct. 11, 1988, which was a continuation of Ser. No. 07/134,562, filed Dec. 8, 1987, which was a continuation of Ser. No. 07/020,229, filed Mar. 2, 1987, which was a continuation of Ser. No. 06/841,044, filed Mar. 17, 1986, which was a continuation of Ser. No. 06/741,020, filed Jun. 3, 1985, which was a continuation of Ser. No. 06/497,805, all now abandoned.

The present invention relates to a divalent europium activated fluorohalide phosphor. More particularly, the invention relates to the improvement on a divalent europium activated barium fluorohalide phosphor.

Heretofore, there is well known a divalent europium activated barium fluorohalide phosphor among alkaline earth metal fluorohalide phosphors; The divalent europium activated barium fluorohalide phosphor emits light having the peak in the near ultraviolet region at the wavelength of about 390 nm upon excitation with a radiation such as X-rays and has the high absorption efficiency for the radiation such as X-rays. Accordingly, this phosphor is employed in practical, especially as a phosphor for a radiographic intensifying screen.

Some improvements upon the above-mentioned divalent europium activated barium fluorohalide phosphor having such excellent characteristics have been proposed to enhance these preferred characteristics. For instance, Japanese Patent Publication No. 51(1976)-28591 describes a divalent europium activated barium fluorohalide phosphor employable for a radiograhic intensifying screen wherein a portion of barium serving as the host component is replaced with the other specific alkaline earth metals, having the formula:

$(Ba_{l-x-y-p}Sr_xCa_yEu_p)F(Cl_{l-a-b}BR_aI_b)$ in which a, b, p, x and y are numbers satisfying the conditions of $y \leqq 0.20$, $x+y+p \leqq 1$, $a+b \leqq 1$ and $0.001 \leqq p \leqq 0 = .20$, respectively.

Also known is the divalent europium activated barium fluorohalide phosphor emits light when exposed to an electromagnetic wave in the wavelength region of 450–800 nm after exposure to a radiation such as X-rays. In other words, the divalent europium activated barium fluorohalide phosphor is a stimulable phosphor. Accordingly, said phosphor has been recently given attention as a phosphor for a radiation image storage panel utilizing its stimulability.

For instance, Japnese Patent Provisional Publication No. 55(1980)-12143 describes a divalent europium activated barium fluorohalide phosphor for a radiation image storage panel wherein a portion of barium serving as the host component is replaced with the other specific alkaline earth metals having the formula:

$(Ba_{l-x-y}Mg_xCa_y)FX:aEu^{2+}$ in which X is at least one halogen selected from the group consisting of Br and Cl; and x, y and a are numbers satisfying the conditions of $0 < x+y \leqq 0.6$, $xy \neq 0$ and $10^{-6} \leqq a \leqq 5 \times 10^{-2}$, respectively.

It is generally desired that the luminance of spontaneous emission of a phosphor is as high as possible. Especially when the phosphor is used in an intensifying screen for radiography for the purpose of medical diagnosis, the phosphor preferably gives the high luminance of spontaneous emission so as to reduce the exposure dose for a patient to as low level as possible. Also desirable is that the luminance of stimulated emission of the phosphor is as high as possible to reduce the exposure dose for a patient in the case of using the phosphor as a stimulable phosphor in a radiation image storage panel. Accordingly, enhancement in the luminance of spontaneous emission is desired for the phosphor used in a radiographic intensifying screen, and likewise enhancement of the luminance of stimulated emission is desired for the phosphor used in a radiation image storage panel. Especially when the radiation is applied to a human body, the enhancement of the luminance of spontaneous emission or of the luminance of stimulated emission is of much value from a point of view of the negative effect of the radiation on the human body, even if the level of the enhancement is not so remarkable. Accordingly, it has been earnestly studied on phosphors for the purpose of the improvement of the emission luminance.

Accordingly, a principal object of the present invention is to provide a divalent europium activated barium fluorohalide phosphor whose luminance of spontaneous emission upon excitation with a radiation, particularly upon excitation with X-rays, is higher than those of the aforementioned known phosphors.

Another object of the invention is to provide a divalent europium activated barium fluorohalide phosphor which gives a stimulated emission with high luminance when stimulated with an electromagnetic wave in the wavelength region of 450-800 nm after exposure to a radiation such as X-rays.

These objects are accomplished by the phoshor of the present invention, that is, a divalent europium activated barium fluorohalide phosphor ($BaFX:Eu^{2+}$, in which X is at least one halogen selected from the group consisting of Cl, Br and I), a portion of the barium serving as a host component being replaced with a monovalent metal and a trivalent metal. In the invention, the monovalent metal is an alkali metal belonging to Second to Sixth Period of Group Ia of Periodic Table, and the trivalent metal is a metal belonging to Third to Sixth Period of Group III of Periodic table; in the latter, however, Eu serving in the phosphor as the activator is excluded though Eu belongs to the Six Period of the Group III.

Accordingly, the phosphor provided by the present invention is a divalent europium activated barium fluorohalide phosphor wherein a portion of barium is replaced with an alkali metal and a trivalent metal, having the formula(I):

$Ba_{l-x}M_{x/2}L_{x/2}FX \cdot yEu^{2+}$ (I)

in which M is at least one alkali metal selected from the group consisting of Li, Na, K, Rb and Cs; L is at least one tivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0 < y \leqq 0.1$, respectively.

The phosphor having the above-mentioned formula (I) provided by the invention gives prominently high emission luminance in a near ultraviolet region in comparison with the known divalent europium activated barium fluorohalide phosphor, when exposed to a radiation such as X-rays, ultraviolet rays or cathode rays.

The phosphor of the present invention having the formula (I) also gives prominently high luminance of stimulated emission in the near ultraviolet region in comparison with the known divalent europium activated barium fluorohalide phosphor, when stimulated with an electromagnetic wave in the wavelength region of 450–800 nm after exposure to a radiation such as X-rays, ultraviolet rays or cathode rays.

The present invention is now described hereinafter more in detail.

The phosphor of the invention can be prepared, for example, by a process described below.

As the starting materials, the following materials can be employed:

1) $BaF_2$;
2) at least one barium halide selected from the group consisting of $BaCl_2$, $BaBr_2$ and $BaI_2$;
3) at least one alkali metal halide selected from the group consisting of LiCl, NaCl, KCl, RbCl, CsCl, LiBr, NaBr, KBr, RbBr, CsBr, LiI, NaI, KI, RbI and CsI;
4) at least one metal oxide selected from the group consisting of $Sc_2O_3$, $Y_2O_3$, $La_2O_3$, $CeO_2$, $Pr_2O_3$, $Nd_2O_3$, $Pm_2O_3$, $Sm_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, $Al_2O_3$, $Ga_2O_3$, $In_2O_3$ and $Tl_2O_3$;
5) at least one hydrohalogenic acid selected from the group consisting of HF, HCl, HBr and HI; and
6) a trivalent europium compound such as a europium halide, europium oxide, europium nitrate or europium sulfate.

An ammonium halide ($NH_4X'$, in which $X'$ is F, Cl, Br or I) can be employed as a flux, if desired.

The above-mentioned five kinds of the starting materials are, in the first place, mixed in the stoichiometric ratio corresponding to the formula (I):

$$Ba_{1-x}M_{x/2}L_{x/2}FX:yEu^{2+} \qquad (I)$$

in which M, L, X, x and y have the same meanings as defined hereinbefore.

The mixture is prepared by initially dissolving the above-mentioned metal oxide (4) in the hydrohalogenic acid (5) and subsequently adding to the solution the barium fluoride (1), the barium halide (2), the alkali metal halide (3), the trivalent europium compound (6) and distilled water, to obtain a suspension. The resulting suspension is heated under stirring and preferably under reduced pressure and/or vacuum to obtain a dry mixture. The mixture is then pulverized in a mortar and is placed in a heat-resistant container such as a quartz boat, an alumina crusible or a quartz crusible, and fired in an electric furnace The temperature for the firing suitably ranges from 600° to 1000° C. The firing period is determined depending upon the amount of the mixture of the starting materials for the phosphor, the firing temperature, etc., and generally ranges from 0.5 to 12 hours. As the firing atmosphere, there can be employed a weak reducing atmosphere such a nitrogen gas atmosphere containing a small amount of hydrogen gas or a carbon dioxide gas atmosphere containing a small amount of carbon monoxide gas. In the firing stage, the trivalent europium contained in the mixture is reduced into the divalent europium under the reducing atmosphere.

The product obtained upon firing under the above-mentioned conditions is taken out of the furnace, allowed to stand for cooling, and pulverized. The so pulverized product may be again placed in the container and fired, if desired. In the second firing, the temperature for the firing suitably ranges from 500° to 800° C. and the firing period suitably ranges from 0.5 to 12 hours. There can be employed for the firing an inert atmosphere such as a nitrogen gas atmosphere or an argon gas atmosphere in place of the weak reducing atmosphere. After the firing is complete, the firing product is finely pulverized to obtain the powdery phosphor of the invention. The obtained phosphor may be processed in a conventional manner involving a variety of procedures for the preparation of phosphors, for instance, a washing procedure, a drying procedure and a sieving procedure.

The phosphor of the present invention prepared in the above-mentioned process is a divalent europium activated barium fluorohalide phosphor in which a portion of barium is replaced with an alkali metal and a trivalent metal, having the formula (I):

$$Ba_{1-x}M_{x/2}L_{x/2}FX:yEu^{2+} \qquad (I)$$

in which M is at least one alkali metal selected from the group consisting of Li, Na, K, Rb and Cs; L is at least one tivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively.

In the above-mentined formula (I), M preferably is at least one alkali metal selected from the group consisting of Li, Na and Cs; and L preferably is at least one trivalent metal selected from the group consisting of Sc, Y, La, Gd and Lu, from the viewpoint of the emission luminance under excitation with a radiation such as X-rays. The preferred numbers for x and y are in the ranges of $10^{-2} \leq x \leq 0.2$ and $10^{-5} \leq y \leq 10^{-2}$, respectively.

FIG. 1 shows a relationship between the x value and the emission luminance in tems of relative value, namely the relative luminance, for a phosphor of the present invention having the formula (I). More in detail, the graph in FIG. 1 illustrates a relationship between the total replacing amounts (x value) of cesium and gadorinium in place of the barium (one of the host components of the phosphor), and the luminance of spontaneous emission thereof when exposed to X-rays at 80 KVp, with respect to the phosphor having the formula:

$$Ba_{1-x}Cs_{x/2}GD_{x/2}FBr:0.001Eu^{2+}$$

As is clear from FIG. 1, the emission luminance is remarkably increased when a portion of barium is replaced with a monovalent cesium and a trivalent gadoinium within the suitable range. The emission luminance reaches the maximum when the replacing amount (x value) is approximately 0.1 and in contrast, is noticiably decreased where the x value is beyond 0.25.

A similar relationship between the replacing amounts and the emission luminance was also observed, when M and L were replaced with the other aforementioned metals specified for the formula (I). Also was observed a similar relationship between the replacing amounts (x value) and the emission luminance with respect to the stimulated emission of a phosphor of the present invention.

The phosphor of the present invention, as mentioned above, emits light with remarkably higher luminance upon excitation with a radiation such as X-rays as compared with the known divalent europium activted barium fluorohalide phosphor. The phosphor of the present invention also emits light with remarkably higher luminance upon stimulation with an electromagnetic wave in the wavelength region of 450-800 nm after exposure to a radiation, as compared with the known divalent europium divalent europium activated barium fluorohalide phosphor. Accordingly, the phosphor of the present invention is suitably employable in a radiographic intensifying screen, as well as in a radiation image storage panel.

The present invention is now illustrated by the following examples, but these examples by no means restrict the invention.

EXAMPLE 1

5 g. of gadoinium oxide ($Gd_2O_3$) was dissolved in a mixture of 9.67 cc. of hydrobromic acid (HBr; 47 weight %) and 110 cc. of distilled water ($H_2O$) to prepare a solution. To the resulting solution, 77.41 g. of barium bromide ($BaBr_2 2H_2O$), 50.92 g. of barium fluoride ($BaF_2$), 5.87 g. of cesium bromide (CsBr) and 0.228 g. of europium bromide ($EuBr_3$) were added, and mixed to give a suspension. The suspension was dried at 60° C. under reduced pressure for 3 hours and further dried at 150° C. under vaccum for another 3 hours. The so dried product was finely pulverized in an automortar to give a homogeneous mixture.

The so pulverized mixture was placed in an alumina crusible, which was, in turn, placed in a high-temperature electric furnace The mixture was then fired at 800° C. for 1 hour under a carbon dioxide gas atmosphere containing a small amount of carbon monoxide. After the firing was complete, the crusible was taken out of the furnace and allowed to stand for cooling. The fired product was pulverized, placed in the alumina crusible again, and then fired at 600° C. for 1 hour under a nitrogen gas atmosphere (the second firing). After the second firing was complete, the fired product was allowed to stand for cooling and pulverized finely to obtain a divlent europium activated barium cesium gadoinium fluorobromide phosphor powder ($Ba_{0.9}Cs_{0.05}FBr:0.001Eu^{2+}$).

EXAMPLE 2

1.5 g. of gadoinium oxide ($Gd_2O_3$) was dissolved in a mixture of 2.9 cc. of hydrobromic acid (HBr; 47 weight %) and 120 cc. of distilled water ($H_2O$) to prepare a solution. To the solution, 90.95 g. of barium bromide ($BaBr_2 2H_2O$), 50.92 g. of barium fluoride ($BaF_2$), 1.76 g. of cesium bromide (CsBr) and 0.228 g. of europium bromide ($EuBr_3$) were added and mixed to give a suspension of the starting materials for the preparation of a phosphor.

The procedure of Example 1 was repeated except for using the so prepared suspension to obtain a divalent europium activated barium caesium gadoinium fluorobromide phosphor powder ($Ba_{0.97}Cs_{0.015}GD_{0.015}FBr:0.001Eu^{2+}$).

EXAMPLE 3

10 g. of gadoinium oxide ($Gd_2O_3$) was dissolved in a mixture of 19.34 cc. of hydrobromic acid (HBr; 47 weight %) and 100 cc. of distilled water ($H_2O$) to prepare a solution. To the solution, 58.05 g. of barium bromide ($BaBr_2 2H_2O$), 50.92 g. of barium fluoride ($BaF_2$), 11.74 cesium bromide (CsBr) and 0.228 g. of europium bromide ($EuBr_3$) were added and mixed to give a suspension of the starting materials for the preparation of a phosphor. The procedure of Example 1 was repeated except for using the so prepared suspension to obtain a divalent europium activated barium cesium gadoinium fluorobromide phosphor powder ($Ba_{0.8}Cs_{0.1}Gd_{0.1}FBr:0.001Eu^{2+}$).

COMPARISON EXAMPLE 1

96.76 g. of barium bromide ($BaBr_2 2H_2O$), 50.92 g. of barium fluoride ($BaF_2$), 0.228 g. of europium bromide (EuBr3) were mixed in 120 cc. of distilled water ($H_2O$) to give a suspension of the starting materials for the preparation of a phosphor.

The procedure of Example 1 was repeated except for using the so prepared suspension to obtain a divalent europium activated barium fluorobromide phosphor powder ($BaFBr: 0.001Eu^{2+}$).

The phoshors prepared in Examples 1, 2 and 3, and Comparison Example 1 were exposed to X-rays at 80 KVp to evaluate the luminance of spontaneous emission.

The results are set forth in Table 1.

TABLE 1

|  | x Value | Relative Luminance |
|---|---|---|
| Example 1 | 0.1 | 290 |
| 2 | 0.03 | 200 |
| 3 | 0.2 | 152 |
| Com. Example 1 | 0 | 100 |

EXAMPLE 4

0 g. of gadoinium oxide ($Gd_2O_3$) was dissolved in a mixture of 19.34 cc. of hydrobromic acid (HBr; 47 weight %) and 200 cc. of distilled water ($H_2O$) to prepare a solution. To the solution, 146.93 g. of barium bromide (($BaBr_2 2H_2O$)), 96.74 g. of barium fluoride ($BaF_2$), 5.68 g. of sodium bromide (NaBr) and 0.432 g. of europium bromide ($EuBr_3$) were added and mixed to give a suspension. The suspension was dried at 60° C. under reduced pressure for 3 hours and further dried at 150° C. under vaccum for another 3 hours, and the so dried product was finely pulverized in an automortar to give a homogeneous mixture.

The so pulverized mixture was placed in a quartz boat, which was, in turn, placed in a high-temperature electric furnace. The mixture was then fired at 800° C. for 1 hour under a nitrogen gas atmosphere containing 3 % hydrogen gas in volume. After the firing was complete, the crusible was taken out of the furnace and allowed to stand for cooling. Then the fired product was pulverized finely to obtain a divalent europium activated barium sodium gadoinium fluorobromide phosphor powder ($Ba_{0.9}Na_{0.05}Gd_{0.05}FBr:0.001Eu^{2+}$.

EXAMPLE 5

3 g. of gadoinium oxide ($Gd_2O_3$) was dissolved in a mixture of 5.8 cc. of hydrobromic acid (HBr; 47 weight %) and 200 cc. of distilled water ($H_2O$) to prepare a solution. To the solution, 172.92 g. of barium bromide ($BaBr_2 2H_2O$), 96.74 g. of barium fluoride ($BaF_2$), 1.70 g. of sodium bromide (NaBr) and 0.432 g. of europium bromide ($EuBr_3$) were added and mixed to give a suspension of the starting materials for the preparation of a phosphor.

The procedure of Example 4 was repeated except for using the so prepared suspension to obtain a divalent europium activated barium sodium gadoinium fluorobromide phosphor powder ($Ba_{0.97}Na_{0.015}Gd_{0.015}FBr:0.001Eu^{2+}$).

EXAMPLE 6

20 g. of gadorinium oxide ($Gd_2O_3$) was dissolved in a mixture of 38.67 cc. of hydrobromic acid (HBr; 47 weight %) and 150 cc. of distilled water ($H_2O$) to prepare a solution. To the solution, 110.28 g. of barium bromide ($BaBr_2 2H_2O$), 96.74 g. of barium fluoride ($BaF_2$), 11.35 g of sodium bromide (NaBr) and 0.432 g. of europium bromide ($EuBr_3$) were added and mixed to give a suspension of the starting materials for the preparation of a phosphor. The procedure of Example 4 was repeated except for using the so prepared suspension to obtain a divalent europium activated barium sodium gadoinium fluorobromide phosphor powder ($Ba_{0.08}Na_{0.1}Gd_{0.1}FBr:0.001Eu^{2+}$).

The phosphors prepared in Examples 4, 5 and 6 were exposed to X-rays at 80 KVp to evaluate the luminance of spontaneous emission.

The results are set forth in Table 2. The aforementioned result on the phosphor prepared in Comparison Example 1 is also set forth in Table 2.

TABLE 2

|  | x Value | Relative Luminance |
|---|---|---|
| Example 4 | 0.1 | 150 |
| 5 | 0.03 | 180 |
| 6 | 0.2 | 120 |
| Com. Example 1 | 0 | 100 |

EXAMPLE 7

17.98 g. of lanthanum oxide ($la_2O_3$) was dissolved in a mixture of 38.67 cc. of hydrobromic acid (HBR; 47 weight %) and 150 cc. of distilled water ($H_2O$) to prepare a solution To the solution, 110.28 g. of barium bromide ($BaBr_2 2H_2O$), 96.74 g. of barium fluoride ($BaF_2$), 11.35 g. of sodium bromide (NaBr) and 0.432 g. of europium bromide ($EuBr_3$) were added and mixed to give a suspension of the starting materials for the preparation of a phosphor.

The procedure of Example 4 was repeated except for using the so prepared suspension to obtain a divalent europium activated barium sodium lanthanum fluorobromide phosphor powder ($Ba_{0.8}Na_{0.1}La_{0.1}FBr:0.001Eu^{2+}$)

The phoshor prepared in Examples 7 was exposed to X-rays at 80 KVp to evaluate the luminance of spontaneous emission.

The result is set forth in Table 3. The aforementioned result on the phosphor prepared in Comparison Example 1 is also set forth in Table 3.

TABLE 3

|  | x Value | Relative Luminance |
|---|---|---|
| Example 7 | 0.2 | 118 |
| Com. Example 1 | 0 | 100 |

We claim:

1. A divalent europium activated barium fluorohalide phosphor wherein a portion of barium is replaced with an alkali metal and a trivalent metal, having the formula:

$$Ba_{1-x}M_{x/2}L_{x/2}FX:yEu^{2+}$$

in which M is at least one alkali metal selected from the group consisting of Na, and Cs; L is Gd; X is at least one halogen selected from the group consisting of Cl, Br and I; and x and y are numbers satisfying the conditions of $10^{-2} \leq x \leq 0.2$ and $0 < y \leq 0.1$, respectively.

2. The phosphor as claimed in claim 1, in which x and y are numbers satisfying the conditions of $x = 0.2$ and $Y = 10^{-3}$, respectively.

3. The phosphor as claimed in claim 1 or claim 2, in which M is Cs.

* * * * *